United States Patent
Tsujita

(10) Patent No.: US 9,208,409 B2
(45) Date of Patent: Dec. 8, 2015

(54) DISPLAY APPARATUS, METHOD FOR CONTROLLING THE SAME, AND STORAGE MEDIUM FOR DISPLAYING A SCHEDULE SCREEN FOR PRINT JOBS TO BE EXECUTED

(71) Applicant: CANON KABUSHIKI KAISHA, Toyko (JP)

(72) Inventor: Kosuke Tsujita, Tama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/308,056

(22) Filed: Jun. 18, 2014

(65) Prior Publication Data

US 2014/0376048 A1    Dec. 25, 2014

(30) Foreign Application Priority Data

Jun. 21, 2013    (JP) .................... 2013-130537

(51) Int. Cl.
*G06K 15/00*    (2006.01)

(52) U.S. Cl.
CPC .......... *G06K 15/005* (2013.01); *G06K 15/4065* (2013.01)

(58) Field of Classification Search
USPC ........................................... 358/1.15
See application file for complete search history.

(56) References Cited

U.S. PATENT DOCUMENTS

2010/0046977 A1\* 2/2010 Inenaga et al. .................. 399/81
2011/0013924 A1\* 1/2011 Hosoi .............................. 399/83

FOREIGN PATENT DOCUMENTS

JP    2010-50883 A    3/2010

\* cited by examiner

*Primary Examiner* — Ngon Nguyen
(74) *Attorney, Agent, or Firm* — Canon USA, Inc., IP Division

(57) ABSTRACT

On a job schedule screen that displays a type of sheet, information for identifying a sheet storage unit in which the number of sheets has become smaller than or equal to a certain value is displayed. An identifier, which is the information for identifying a sheet storage unit, is set by a user.

9 Claims, 20 Drawing Sheets

| SHEET TYPE | PAPER FEED DECK | Job1 | | Job2 | | Job3 | Job4 | Job5 | | | | |
|---|---|---|---|---|---|---|---|---|---|---|---|---|
| | | 0 | 5 | 10 | 15 | 20 | 25 | 30 | 35 | 40 | 45 | 50 | 55 | 60 |
| A4 PLAIN PAPER | | 3 | 5 | | | | | | | | | |
| LTR PLAIN PAPER | | | | 6 | | | | | | | | |
| LTR HEAVY PAPER | | | | | | 1 | | | | | | |
| A4 HEAVY PAPER | | | | | | | 2 | | | | | |
| 11×17 PLAIN PAPER | | | | | | | | 4 | 7 | | | |

FIG. 3A

| SHEET TYPE | PAPER FEED DECK | 0 | 5 | 10 | 15 | 20 | 25 | 30 | 35 | 40 | 45 | 50 | 55 | 60 |
|---|---|---|---|---|---|---|---|---|---|---|---|---|---|---|
| (1) | | | [1] | | | | | | | | | | | |
| (2) | | | [2] | | | | | | | | | | | |
| (3) | | | [3] | | | | | | | | | | | |
| (4) | | | [4] | | | | | | | | | | | |
| (5) | | | [5] | | | | | | | | | | | |
| (6) | | | [6] | | | | | | | | | | | |
| (7) | | | [7] | | | | | | | | | | | |

DRAWING START POSITION (draw_time_line)

FIG. 3B

| SHEET TYPE | PAPER FEED DECK | Job1 | | Job2 | | Job3 | Job4 | | Job5 | | | | |
|---|---|---|---|---|---|---|---|---|---|---|---|---|---|
| | | 0 | 5 | 10 | 15 | 20 | 25 | 30 | 35 | 40 | 45 | 50 | 55 | 60 |
| A4 PLAIN PAPER | | 3 | 5 | | | | | | | | | | | |
| LTR PLAIN PAPER | | | | | 6 | | | | | | | | | |
| LTR HEAVY PAPER | | | | | | | 1 | | | | | | | |
| A4 HEAVY PAPER | | | | | | | | 2 | | | | | | |
| 11×17 PLAIN PAPER | | | | | | | | | | 4 | 7 | | | |

FIG. 3C

| SHEET TYPE | PAPER FEED DECK | Job1 | | Job2 | | | Job3 | | Job4 | | Job5 | | | |
|---|---|---|---|---|---|---|---|---|---|---|---|---|---|---|
| | | 0 | 5 | 10 | | 15 | 20 | | 25 | | 30 | 35 | | |
| A4 PLAIN PAPER | | | 5 | | 6 | | | | | | | | | |
| LTR PLAIN PAPER | | | | | | | | 1 | | | | | | |
| LTR HEAVY PAPER | | | | | | | | | | 2 | | | | |
| A4 HEAVY PAPER | | | | | | | | | | | | | 4 | |
| 11×17 PLAIN PAPER | | | | | | | | | | | | | | 7 |

1210

PAPER FEED DECK 3 IS EMPTY — 1211

FIG. 3D

| SHEET TYPE | PAPER FEED DECK | Job1 | | Job2 | | Job3 | | Job4 | | Job5 | | | Job6 | | |
|---|---|---|---|---|---|---|---|---|---|---|---|---|---|---|---|
| | | 0 | 5 | 10 | 15 | 20 | | 25 | | 30 | 35 | | 40 | 45 | 50 |
| A4 PLAIN PAPER | | | 5 | | 6 | | | | | | | | | | |
| LTR PLAIN PAPER | | | | | | | 1 | | | | | | | | |
| LTR HEAVY PAPER | | | | | | | | | 2 | | | | | | |
| A4 HEAVY PAPER | | | | | | | | | | | 4 | | | | |
| 11×17 PLAIN PAPER | | | | | | | | | | | | 7 | | | |
| A3 PLAIN PAPER | | | | | | | | | | | | | | | ▯ |

1212

PAPER FEED DECK 3 IS EMPTY — 1213

OPEN: PAPER FEED DECK 3 — 1215

| SHEET ID | NAME | SIZE | WEIGHT (g/m²) | PRINTING TIME PER SHEET (s) |
|---|---|---|---|---|
| 0001 | A4 PLAIN PAPER | A4 | 100 | 1 |
| 0002 | A3 PLAIN PAPER | A3 | 100 | 2 |
| 0003 | LTR PLAIN PAPER | LTR | 100 | 1 |
| 0004 | LTR HEAVY PAPER | LTR | 135 | 3 |
| 0005 | 11×17 PLAIN PAPER | 11×17 | 100 | 3 |
| 0006 | A2 PLAIN PAPER | A2 | 100 | 4 |
| 0007 | A4 HEAVY PAPER | A4 | 100 | 3 |
|  |  |  |  |  |

FIG. 5A

SHEET TYPE REGISTRATION SCREEN — 1501

| SELECT | SHEET TYPE ID | NAME | SIZE | WEIGHT (g/m²) |
|---|---|---|---|---|
| ☑ | 0001 | A4 PLAIN PAPER | A4 | 100 |
| ☐ | 0002 | A3 PLAIN PAPER | A3 | 100 |
| ☐ | 0003 | LTR PLAIN PAPER | LTR | 100 |
| ☐ | 0004 | LTR HEAVY PAPER | LTR | 135 |
| ☐ | 0005 | 11×17 PLAIN PAPER | 11×17 | 100 |
| ☐ | 0006 | A2 PLAIN PAPER | A2 | 100 |
| ☐ | 0007 | A4 HEAVY PAPER | A4 | 135 |
| ☐ | | | | |

1502 — (checkbox row 0001)

[NEW] 1503   [EDIT] 1504   [REMOVE] 1505   [RETURN] 1506

FIG. 5B

SHEET TYPE INFORMATION INPUT SCREEN — 1507

NAME [ ] — 1508

1509 — SIZE

| A2 |
| A3 |
| A4 |
| A5 |
| LTR |
| 11×17 |
| B5 |

WEIGHT
1510 — [ ] g/m²

[OK] 1511   [CANCEL] 1512

| PAPER FEED DECK No. | MAXIMUM STORAGE CAPACITY | NUMBER OF SHEETS REMAINING | SHEET TYPE | SHEET DIRECTION |
|---|---|---|---|---|
| 1 | 1000 | 1000 | LTR HEAVY PAPER | PORTRAIT |
| 2 | 1000 | 1000 | A4 HEAVY PAPER | PORTRAIT |
| 3 | 500 | 200 | A4 PLAIN PAPER | PORTRAIT |
| 4 | 500 | 100 | 11×17 PLAIN PAPER | LANDSCAPE |
| 5 | 2000 | 2000 | A4 PLAIN PAPER | PORTRAIT |
| 6 | 2000 | 2000 | LTR PLAIN PAPER | PORTRAIT |
| 7 | 2000 | 2000 | 11×17 PLAIN PAPER | LANDSCAPE |

REGISTER SHEET TYPE TO PAPER FEED DECK

| PAPER FEED DECK No. | NAME | SHEET TYPE REGISTRATION |
|---|---|---|
| 1 | LTR HEAVY PAPER | REGISTER |
| 2 | A4 HEAVY PAPER | REGISTER |
| 3 | A4 PLAIN PAPER | REGISTER |
| 4 | 11×17 PLAIN PAPER | REGISTER |
| 5 | A4 PLAIN PAPER | REGISTER |
| 6 | LTR PLAIN PAPER | REGISTER |
| 7 | 11×17 PLAIN PAPER | REGISTER |

OK    CANCEL

SELECT SHEET TYPE TO BE REGISTERED TO PAPER FEED DECK

| SELECT | SHEET ID | NAME | SIZE | WEIGHT (g/m$^2$) |
|---|---|---|---|---|
| ● | 0001 | A4 PLAIN PAPER | A4 | 100 |
| ○ | 0002 | A3 PLAIN PAPER | A3 | 100 |
| ○ | 0003 | LTR PLAIN PAPER | LTR | 100 |
| ○ | 0004 | LTR HEAVY PAPER | LTR | 135 |
| ○ | 0005 | 11×17 PLAIN PAPER | 11×17 | 100 |
| ○ | 0006 | A4 HEAVY PAPER | A4 | 135 |

OK    CANCEL

FIG. 9

| SCHEDULE No. | JOB ID | JOB NAME | SHEET ID | JOB STATUS | NUMBER OF SHEETS TO BE PRINTED | NUMBER OF SHEETS YET TO BE PRINTED | PAPER FEED SCHEDULE [PAPER FEED DECK No., NUMBER OF SHEETS TO BE FED, REQUIRED TIME (s)] | SHORTFALL IN NUMBER OF SHEETS [SHORTFALL, REQUIRED TIME (s)] |
|---|---|---|---|---|---|---|---|---|
| 0001 | 0001 | Job1 | 0001 | NOT YET | 500 | 500 | [3, 200, 200][5, 300, 300] | [0, 0] |
| 0002 | 0002 | Job2 | 0003 | NOT YET | 1000 | 1000 | [6, 1000, 1000] | [0, 0] |
| 0003 | 0003 | Job3 | 0004 | NOT YET | 100 | 100 | [1, 100, 300] | [0, 0] |
| 0004 | 0004 | Job4 | 0007 | NOT YET | 100 | 100 | [2, 100, 300] | [0, 0] |
| 0005 | 0005 | Job5 | 0005 | NOT YET | 200 | 200 | [4, 100, 300][7, 100, 300] | [0, 0] |
| | | | | | | | | |
| | | | | | | | | |

601 / 602 / 603 / 604 / 605

DISPLAY APPARATUS, METHOD FOR CONTROLLING THE SAME, AND STORAGE MEDIUM FOR DISPLAYING A SCHEDULE SCREEN FOR PRINT JOBS TO BE EXECUTED

BACKGROUND OF THE INVENTION

1. Field of the Invention

The present invention relates to a display apparatus, a method for controlling the display apparatus, and a storage medium.

2. Description of the Related Art

In a production printing market, normally a dedicated operator operates a printing system. The operator determines the order of input of print jobs, inputs the print jobs to the printing system, and manages the status of the print jobs. The operator is expected to perform the printing while suppressing the downtime of the printing system as much as possible. In order to support the operator, the printing system is provided with a function of displaying printing status on a screen (refer to Japanese Patent Laid-Open No. 2010-50883). On the screen, print jobs that are being executed and print jobs to be executed are ordered in time. By viewing the screen, the operator can recognize the status of the print jobs.

In Japanese Patent Laid-Open No. 2010-50883, a print job that is being executed or a print job to be executed is displayed on the above-described screen (hereinafter referred to as a schedule screen) as a graph for each type of sheet used. The operator can recognize which type of sheet is used in each print job. Because an identifier of a sheet storage unit used is not displayed, however, the following problem arises. For example, assume that two sheet storage units are used in a print job that is currently being executed.

Furthermore, assume that all other sheet storage units are reserved for use in other print jobs. At this time, in order to perform printing using sheets of a certain type that has not been registered in the sheet storage units, the operator needs to wait until one of the sheet storage units become empty. In the current example, when one of the two sheet storage units used in the print job that is being executed has become empty, the operator can open the sheet storage unit and set the sheets of the certain type.

Since a graph of a print job is displayed for each type of sheet in the schedule screen, however, it is difficult for the operator to immediately notice the presence of the empty sheet storage unit. The printing system has another screen for checking the states of the sheet storage units, and therefore the operator can check the states of the sheet storage units by displaying the screen. However, the operator always needs to recognize the status of the print jobs by viewing the schedule screen, and if the operator frequently displays the screen for checking the states of the sheet storage units, the operator undesirably gets behind in the printing work.

SUMMARY OF THE INVENTION

The present invention provides a display apparatus that displays a schedule screen for jobs to be executed. The display apparatus includes a displaying unit configured to display an object having a length corresponding to time required to perform a job while associating the object with a type of sheet used in the job, and a specifying unit configured to specify a sheet storage unit to be used in the job. The displaying unit displays, on the object, information for identifying the sheet storage unit specified by the specifying unit.

Further features of the present invention will become apparent from the following description of exemplary embodiments with reference to the attached drawings.

BRIEF DESCRIPTION OF THE DRAWINGS

FIGS. 3A to 3D are diagrams illustrating examples of schedule screens displayed on an operation panel illustrated in FIG. 1.

FIG. 4 is a diagram illustrating an example of a sheet type management table.

FIGS. 5A and 5B are diagrams illustrating examples of user interface (UI) screens displayed on the operation panel.

FIGS. 8A and 8B are diagrams illustrating examples of UI screens displayed on the operation panel.

FIG. 9 is a diagram illustrating an example of a schedule management table.

DESCRIPTION OF THE EMBODIMENTS

Figure 1:
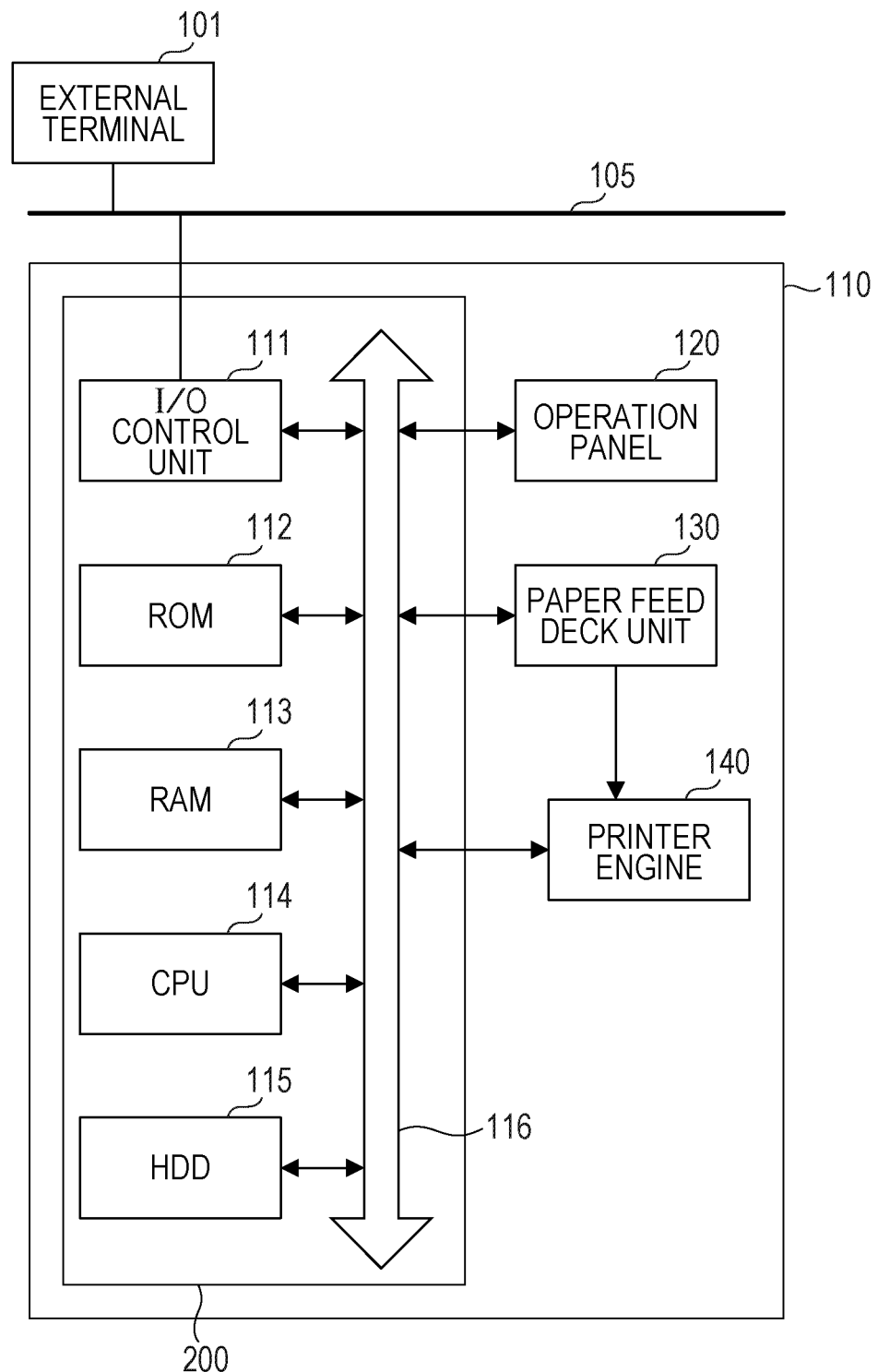
FIG. 1 is a block diagram illustrating the configuration of a printing apparatus to which a display apparatus is applied.

Next, embodiments of the present invention will be described hereinafter with reference to the drawings.
System Configuration
First Embodiment FIG. 1 is a block diagram illustrating the configuration of a printing apparatus to which a display apparatus according to this embodiment is applied. The printing apparatus according to this embodiment includes an external terminal 101 and a printing apparatus 110. In addition, the external terminal 101 and the printing apparatus 110 are connected to each other by a communication line 105. It is to be noted that, needless to say, a plurality of external terminals may be connected, and a large number of users may use their computers as external terminals. This embodiment will be described in detail hereinafter while taking as an example the printing apparatus to which the display apparatus that displays a job schedule to be executed by the printing apparatus is applied.

In FIG. 1, the external terminal 101 obtains information input from a user who is using an input apparatus, which is not illustrated, generates a print job to be transmitted to the printing apparatus 110, and transmits the print job to the printing apparatus 110 through the communication line 105. A controller box 200 performs various types of data processing to control the operation of the printing apparatus 110.

An operation panel 120 receives various operations performed by the user through a UI such as a touch panel. A paper feed deck unit 130 includes a plurality of paper feed decks (an example of a sheet storage unit). Each of the plurality of paper feed decks is, for example, a pull-out, openable paper feed cassette, which stores print sheets (sheets) and feeds the sheets to a printer engine 140 during printing. The printer engine 140 prints images on the print sheets on the basis of image data.

Next, the configuration of the controller box 200 will be described.

An input/output (I/O) control unit 111 controls communication with an external network. A read-only memory (ROM) 112 stores various control programs. A random-access memory (RAM) 113 reads the control programs stored in the ROM 112 and stores the control programs. A central processing unit (CPU) 114 executes the control programs stored in the RAM 113 to control image signals and various devices single-handed. A hard disk drive (HDD) 115 is used for holding a large amount of data such as image data and print data temporarily or for a long period. These modules are connected to one another through a system bus 116. Furthermore, the system bus 116 connects the controller box 200 and the devices in the printing apparatus 110 to each other.

It is to be noted that the RAM 113 also functions as a main memory and a working memory of the CPU 114. In addition, control programs and an operating system are also stored in the HDD 115 as well as the ROM 112. Furthermore, a non-volatile random-access memory (NVRAM), which is not illustrated, may be included and store printing apparatus mode configuration information from the operation panel 120. In addition, the operation panel 120 displays, as necessary, a schedule screen and a paper feed deck check screen, which will be described later.

Figure 2:
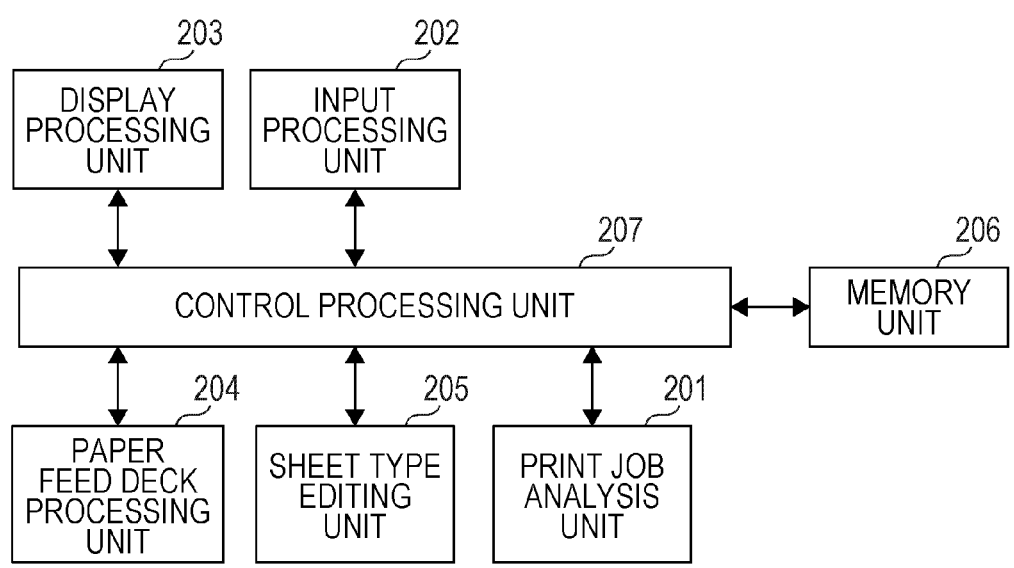
FIG. 2 is a block diagram illustrating the configuration of modules of the printing apparatus illustrated in FIG. 1.

FIG. 2 is a block diagram illustrating the configuration of modules of the printing apparatus 110 illustrated in FIG. 1.

In FIG. 2, a print job analysis unit 201 analyzes various print jobs received by the printing apparatus 110, such as a print job transmitted from the external terminal 101, and reads printing configuration information included in the print jobs. The printing configuration information herein refers to information regarding paper feed such as a sheet size, a sheet type (the type of sheet), and a paper feed deck to be used for the printing.

The printing configuration information read by the print job analysis unit 201 is temporarily saved in a storage device such as the RAM 113 or the HDD 115. The input processing unit 202 receives various inputs from the user who is operating the operation panel 120.

A display processing unit 203 displays a printing schedule, the states of the paper feed decks, and the like. A paper feed deck processing unit 204 has a function of processing sheets set in the paper feed decks. A sheet type editing unit 205 receives a request from the input processing unit 202, such as registration, editing, or removal of a sheet type, and updates a sheet type database (DB), which will be described later. A memory unit 206 stores data to be processed by the paper feed deck processing unit 204 and the sheet type editing unit 205. A control processing unit 207 has a function of processing control of the components 201 to 206 on the basis of the above-described programs.

Registration of Sheet Types

Next, the registration of sheet types will be described.

FIG. 3A is a diagram illustrating an example of a schedule screen 1201 displayed on the operation panel 120 illustrated in FIG. 1. This screen is stored in the memory unit 206 and displayed on the operation panel 120 by the display processing unit 203 in accordance with an instruction from the control processing unit 207. Using this screen, the user performs an operation for registering a sheet type to each of the plurality of paper feed decks included in the printing apparatus.

An operator can recognize the progress of print jobs on this screen displayed on the operation panel 120.

In addition, this screen includes a sheet type button 1202 for enabling the operator to register a sheet type and a paper feed deck button 1203 for enabling the operator to register the registered sheet type to a paper feed deck.

Here, when the operator has pressed any button in the operation panel 120, the input processing unit 202 notifies the control processing unit 207 of the operation. A sheet type management table 301 illustrated in FIG. 4 is stored in the memory unit 206. If the input processing unit 202 notifies the control processing unit 207 that the sheet type button 1202 has been pressed, the control processing unit 207 refers to the sheet type management table 301 stored in the memory unit 206.

The control processing unit 207 then instructs the display processing unit 203 to display a screen 1501 illustrated in FIG. 5A on the operation panel 120 on the basis of registered sheet type information.

Upon receiving the instruction, the display processing unit 203 displays the screen 1501 on the operation panel 120. Using the screen 1501, the operator newly registers, edits, or removes a sheet type. If the user checks one of selection boxes 1502 on the operation panel 120 and presses a new button 1503, the input processing unit 202 notifies the control processing unit 207 of the input content. The control processing unit 207 instructs the display processing unit 203 to display a screen 1507 illustrated in FIG. 5B on the operation panel 120. The screen 1507 is a screen for registering a sheet type. The operator inputs the name of a sheet type in a name field 1508 and selects the size of the sheet type to be registered by operating a scroll bar in a size field 1509. The operator then inputs the weight of the sheet type to be registered in unit area (hereinafter referred to as weight) in a weight field 1510 and presses an OK button 1511.

When the input processing unit 202 has received the input of the OK button 1511, the control processing unit 207 instructs the sheet type editing unit 205 to register the name, the size, and the weight of the sheet type input from the user to the sheet type management table 301. In addition, if the user checks one of the selection boxes 1502 on the operation panel 120 and presses an edit button 1504, the input processing unit 202 notifies the control processing unit 207 of the input content. The control processing unit 207 instructs the display processing unit 203 to display the screen 1507 illustrated in FIG. 5B on the operation panel 120.

Here, the control processing unit 207 instructs the display processing unit 203 to display the name, the size, and the weight of the sheet type selected using one of the selection boxes 1502. The operator operates the operation panel 120 to update information displayed in the name field 1508, the size field 1509, and the weight field 1510 of the sheet type, and then presses the OK button 1511.

When the input processing unit 202 has received the input of the OK button 1511, the control processing unit 207 instructs the sheet type editing unit 205 to register the name, the size, and the weight of the sheet type to the sheet type management table 301. In addition, if the user checks one of the selection boxes 1502 on the operation panel 120 and presses a remove button 1505, the input processing unit 202 notifies the control processing unit 207 of the input content. The control processing unit 207 instructs the sheet type editing unit 205 to remove a sheet type selected using one of the selection boxes 1502 from the sheet type management table 301.

Supply of Sheets to Paper Feed Decks and Check of States of Supplied Sheets

Next, methods for supplying sheets to the paper feed decks and checking the states of supplied sheets will be described.

Figure 6:
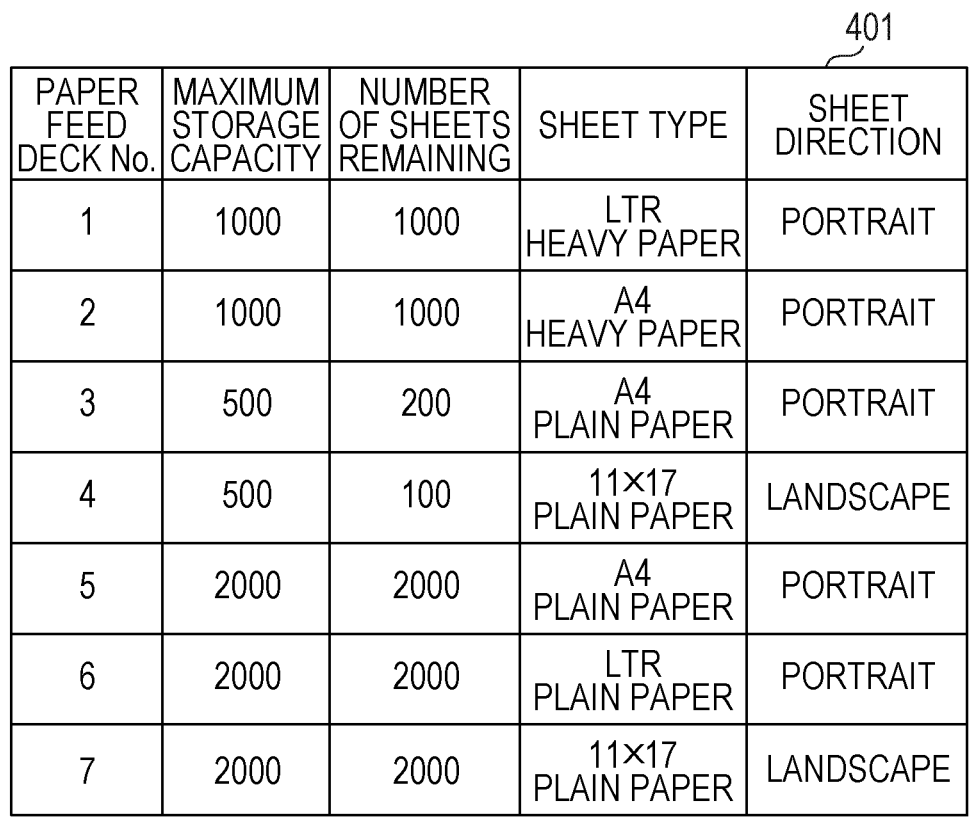
FIG. 6 is a diagram illustrating an example of a paper feed deck state management table.

The operator can open a target pull-out paper feed deck and supply sheets to the paper feed deck by accessing the paper feed deck unit 130 and pressing an open button for the paper feed deck to which the sheets are to be supplied. The number of sheets supplied to the paper feed deck is counted by the paper feed deck processing unit 204 and stored in a number of sheets remaining field in a paper feed deck state management table 401 illustrated in FIG. 6. In addition, the maximum storage capacity, the sheet type, and the direction of the set sheets of each paper feed deck are also detected by the paper feed deck processing unit 204 and stored in the paper feed deck state management table 401. Registration of a sheet type to each paper feed deck will be described later.

The operator presses the paper feed deck button 1203, which is displayed on the operation panel 120, illustrated in FIG. 3A to check the states of the paper feed decks. Upon detecting that the paper feed deck button 1203 has been pressed, the input processing unit 202 notifies the control processing unit 207 of the detection. The control processing unit 207 instructs the paper feed deck processing unit 204 to refer to the paper feed deck state management table 401 illustrated in FIG. 6 and obtain the sheet type of each paper feed deck.

In addition, the control processing unit 207 accesses a schedule management table 601, which will be described later, and obtains the names of print jobs in which the paper feed decks are used. The control processing unit 207 then instructs the display processing unit 203 to display the obtained content on the operation panel 120 in a screen 1301 illustrated in FIG. 7 as paper feed deck information. The operator can check the sheet type and the name of a print job, in which each paper feed deck is used, of each paper feed deck on the screen 1301.

Registration of Sheet Types to Paper Feed Decks

Next, the registration of sheet types to the paper feed decks will be described.

Figure 7:
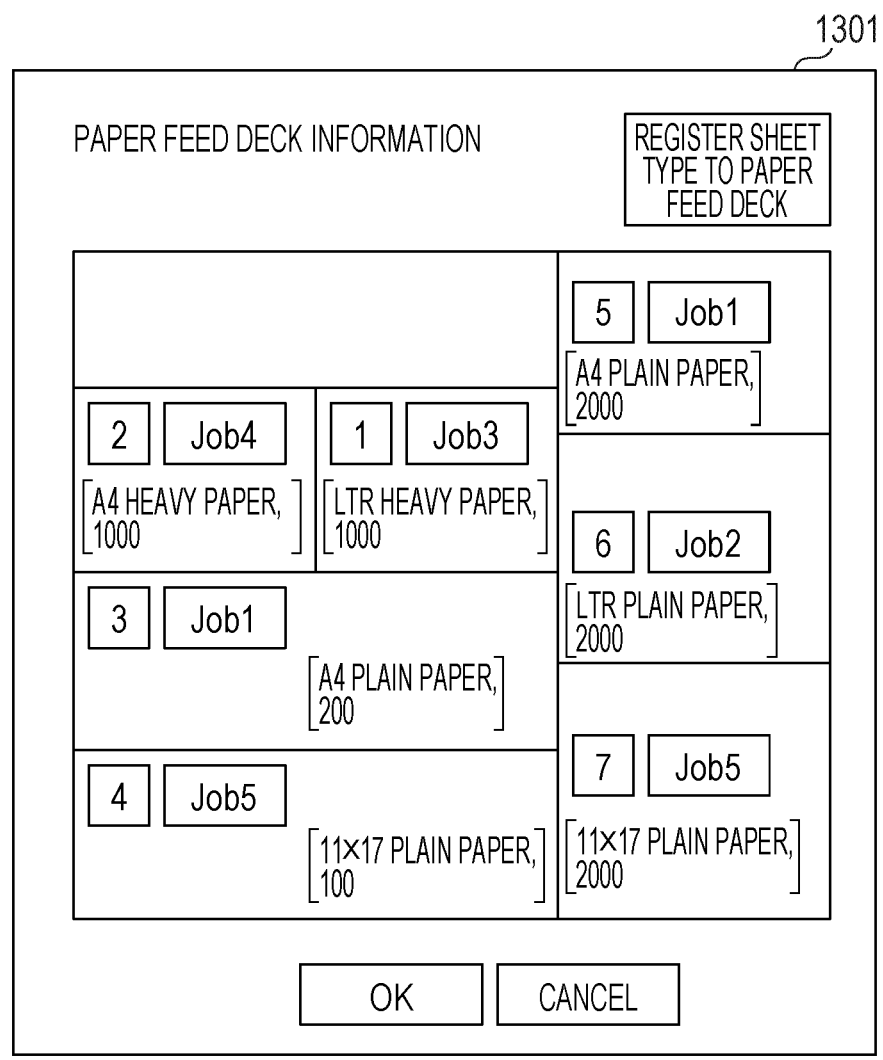
FIG. 7 is a diagram illustrating an example of a UI screen displayed on the operation panel.

When the operator has pressed a "register sheet type to paper feed deck" button on the screen 1301 illustrated in FIG. 7, the input processing unit 202 notifies the control processing unit 207 of the operation. The control processing unit 207 instructs the display processing unit 203 to display a screen 1401 illustrated in FIG. 8A on the operation panel 120. The screen 1401 illustrated in FIG. 8A is a screen for registering a sheet type to each paper feed deck. The operator checks a paper feed deck number (an example of an identifier for identifying a paper feed deck) for which a sheet type is to be registered, and presses a sheet type registration button corresponding to the paper feed number. Upon detecting that the operator has pressed the sheet type registration button, the input processing unit 202 notifies the control processing unit 207 of the detection.

Thereafter, the display processing unit 203 displays a screen 1402 illustrated in FIG. 8B on the operation panel 120. The screen 1402 is a screen for selecting a sheet type to be registered to the paper feed deck selected in the screen 1401 illustrated in FIG. 8A. All sheet types registered in the sheet type management table 301, which has been described above, are displayed in the screen 1420 as candidate sheet types. When the operator has selected a sheet type to be registered and pressed an OK button, the control processing unit 207 registers the selected sheet type to a sheet type field in the paper feed deck state management table 401.

Method for Generating Schedule Management Table

Next, a method for generating the schedule management table 601 will be described.

The schedule management table 601 illustrated in FIG. 9 is stored in the memory unit 206 and displayed while the printer engine 140 is executing a printing process or in order to display print jobs to be executed. The schedule screen 1201, which is displayed in order for the operator to check printing status, is generated on the basis of the schedule management table 601. Here, first, the method for generating the schedule management table 601 will be described.

Figure 10:
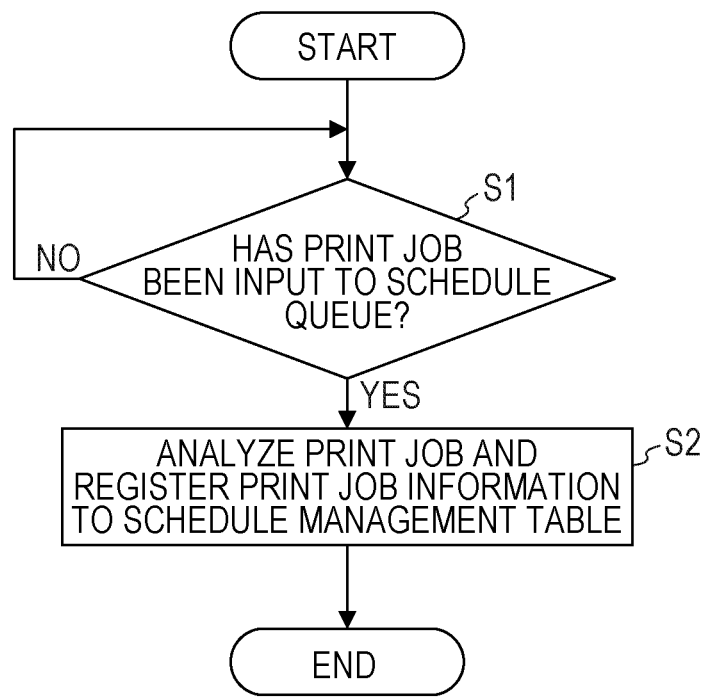
FIG. 10 is a diagram illustrating a method for controlling the printing apparatus.

FIG. 10 is a flowchart illustrating a method for controlling the display apparatus according to this embodiment. Each step in this process is realized when executed by the CPU 114 of the controller box 200 in accordance with the corresponding program stored in the HDD 115. In the following description, the process will be described with reference to the modules illustrated in FIG. 2.

Figure 11:
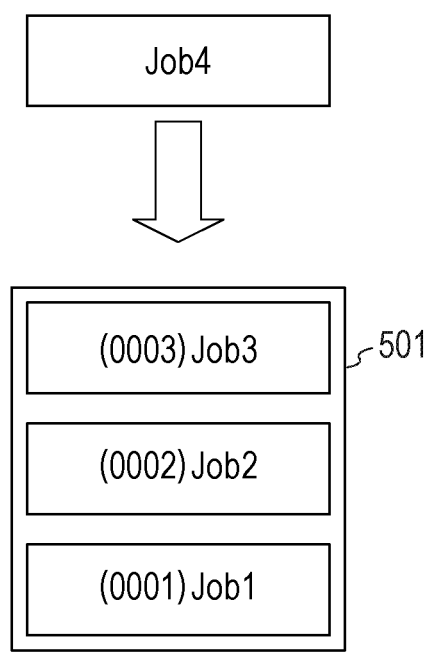
FIG. 11 is a diagram illustrating a job queue.

If a print job is input from the external terminal 101, the control processing unit 207 causes the process to proceed from S1 to S2. In S2, the control processing unit 207 instructs the print job analysis unit 201 to analyze the print job. A job ID, a job name, and the number of sheets to be printed obtained as a result of the analysis are connected with a schedule number and stored in a schedule queue 501 in the memory unit 206. Furthermore, a job status is set to "not yet" and the number of sheets yet to be printed is set to the number of sheets to be printed obtained as a result of the job analysis, and then the process ends. An image of the schedule queue 501 in which information regarding print jobs is stored is illustrated in FIG. 11. In the print job information stored in the schedule queue 501, the number of sheets yet to be printed is updated in accordance with the progress of printing performed by the printer engine 140.

Figure 12:
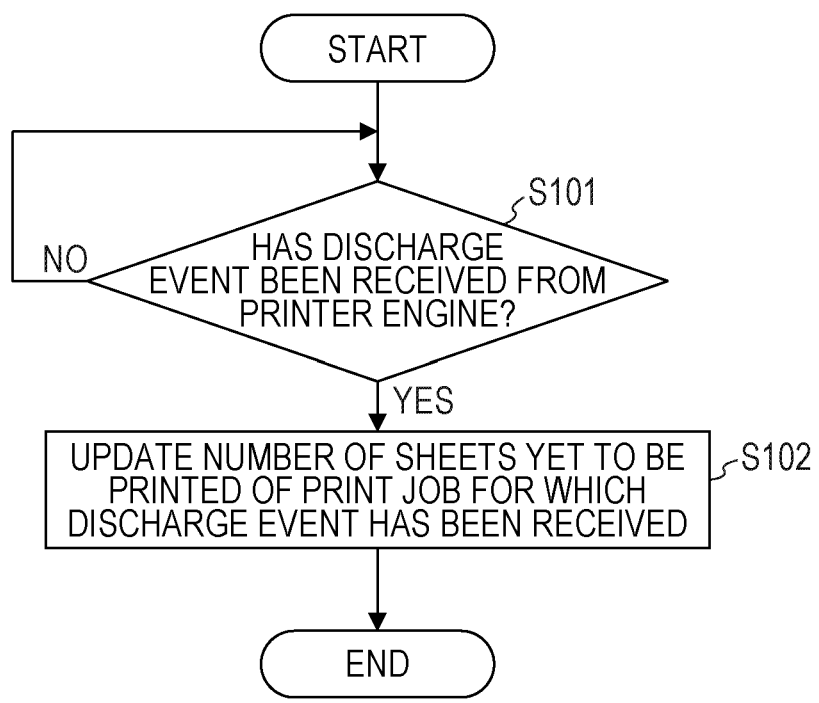
FIG. 12 is a flowchart illustrating a method for controlling the printing apparatus.

FIG. 12 is a flowchart illustrating a method for controlling the printing apparatus according to this embodiment. This example is an example of a process for updating the number of sheets yet to be printed. Each step in this process is realized when executed by the CPU 114 of the controller box 200 in accordance with the corresponding program stored in the HDD 115. In the following description, the process will be described with reference to the modules illustrated in FIG. 2.

In S101, upon receiving, from the printer engine 140, an event indicating that a sheet has been discharged, the control processing unit 207 causes the process to proceed to S102. In S102, the control processing unit 207 decrements, by 1, the number of sheets yet to be printed of a job ID for which the discharge event has been received, and ends the process. Thus, as the printing performed by the printer engine 140 progresses, the number of sheets yet to be printed in the schedule management table 601 is updated.

Figure 13:
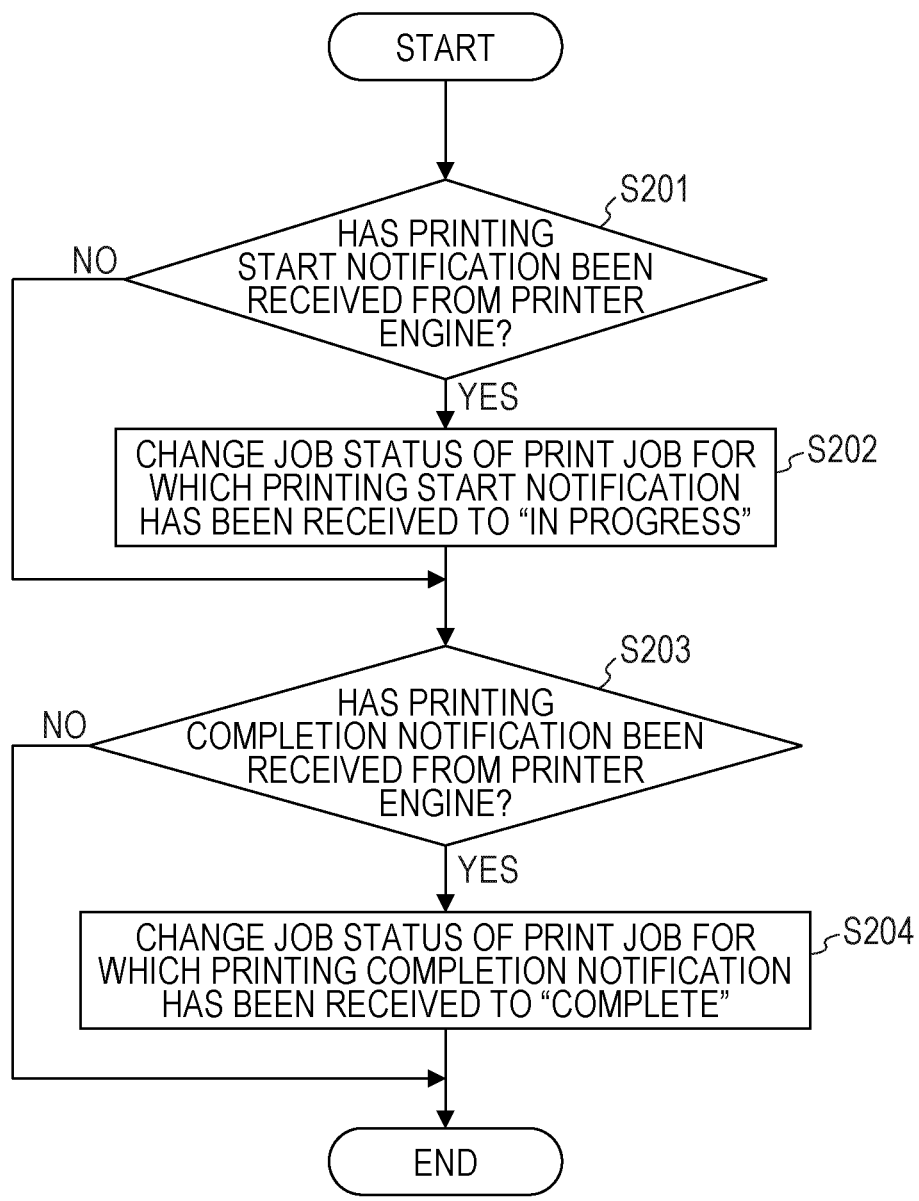
FIG. 13 is a flowchart illustrating a method for controlling the printing apparatus.

FIG. 13 is a flowchart illustrating a method for controlling the printing apparatus according to this embodiment. This example is an example of a process for updating the job status field in the schedule management table 601. Each step in this process is realized when executed by the CPU 114 of the controller box 200 in accordance with the corresponding program stored in the HDD 115. In the following description, the process will be described with reference to the modules illustrated in FIG. 2.

In S201, upon receiving a notification of start of printing from the printer engine 140, the control processing unit 207 stores a job ID of a print job in which the printing has started in the memory unit 206 and causes the process to proceed to S202. In S202, the control processing unit 207 accesses the memory unit 206 and reads the job ID of the print job in which the printing has started. The control processing unit 207 then accesses the schedule management table 601 and updates the job status of the read job ID from "not yet" to "in progress". After the update, the control processing unit 207 causes the process to proceed to S203. In S203, the control processing unit 207 checks whether or not a notification of completion of the printing has been received from the printer engine 140. If a notification of completion of the printing has been received, the control processing unit 207 stores the job ID of the print job in which the printing has been completed in the memory unit 206 and causes the process to proceed to S204.

In S204, the control processing unit 207 accesses the memory unit 206 and reads the job ID of the print job in which the printing has been completed. The control processing unit 207 then accesses the schedule management table 601 and updates the job status of the read job ID from "in progress" to "complete". After the update, the control processing unit 207 ends the process. Thus, the job status of the schedule management table 601 is updated on the basis of the notifications of start of printing and completion of printing from the printer engine 140. Next, a method for updating a paper feed schedule field 604 and a shortfall in the number of sheets field 605, which indicates a shortfall in the number of sheets, in the schedule management table 601 will be described with reference to flowcharts of FIGS. 14A and 14B.

Figure 14A:
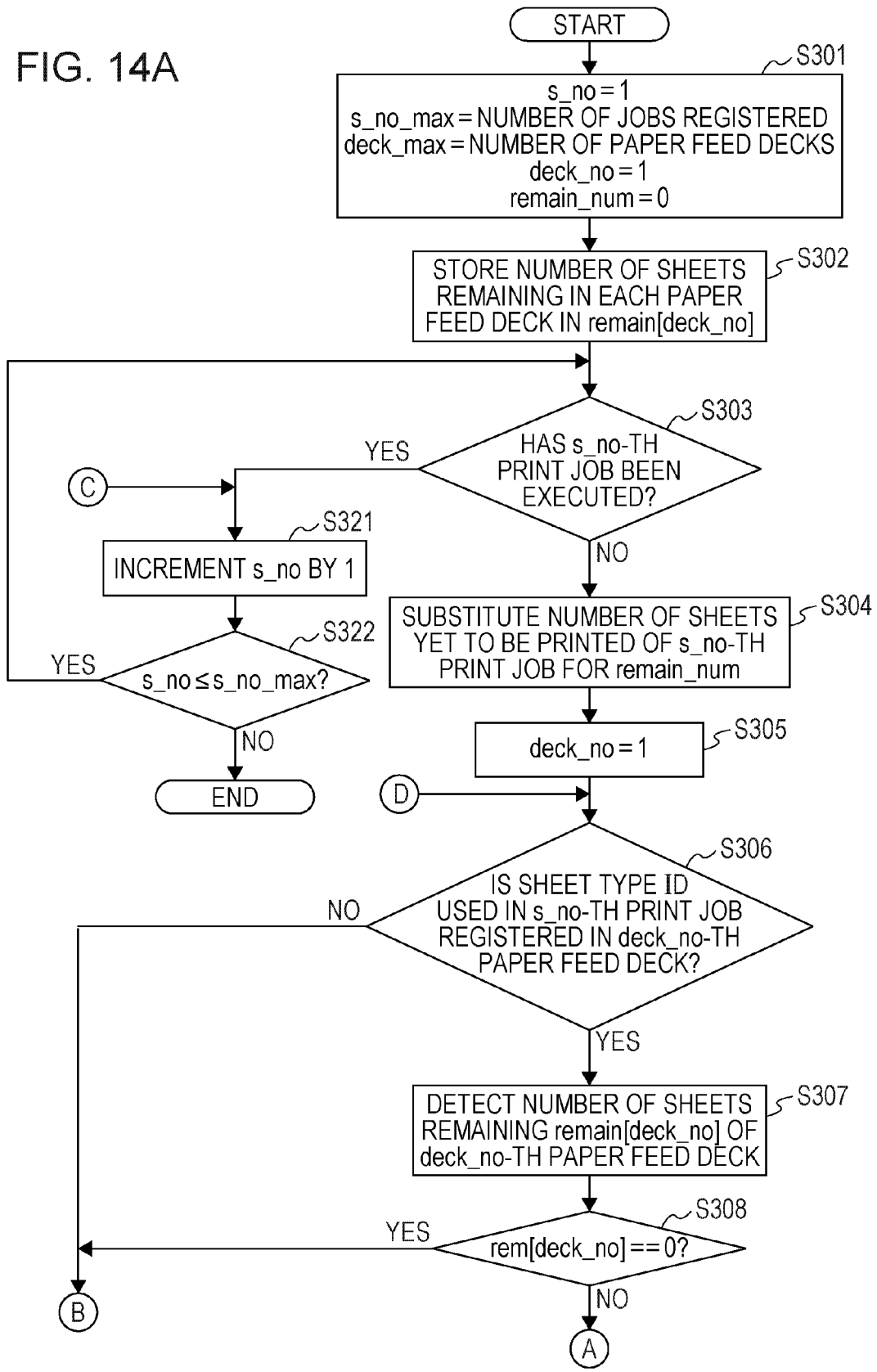
FIGS. 14A and 14B are flowcharts illustrating a method for controlling the printing apparatus.
Figure 14B:
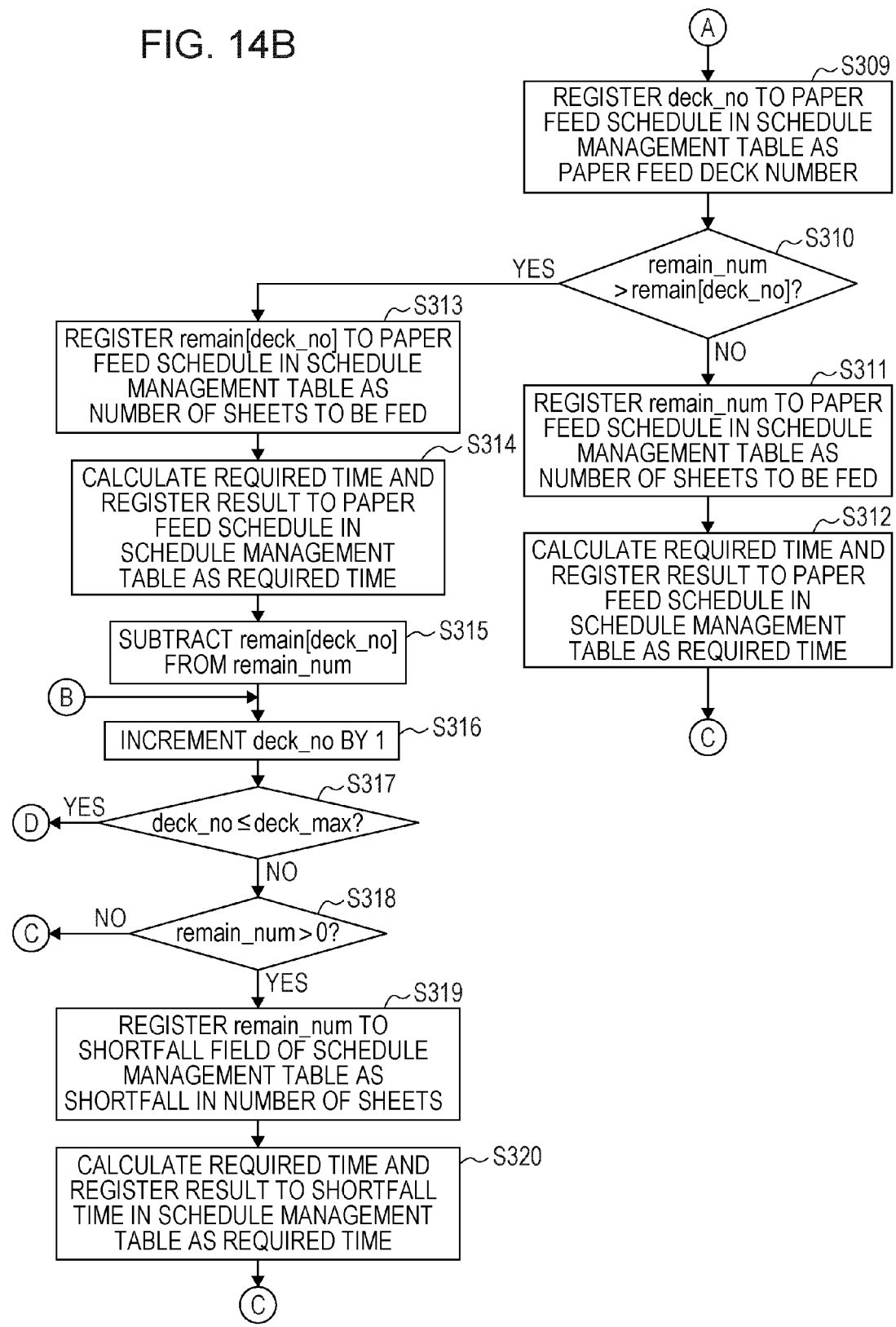

FIGS. 14A and 14B are flowcharts illustrating a method for controlling the printing apparatus according to this embodiment. This example is an example of a process for updating the paper feed schedule field 604 and the shortfall in the number of sheets field 605, which indicates a shortfall in the number of sheets, in the schedule management table 601. Each step in this process is realized when executed by the CPU 114 of the controller box 200 in accordance with the corresponding program stored in the HDD 115. In the following description, the process will be described with reference to the modules illustrated in FIG. 2. Assume that, in an initial state, five print jobs having job IDs 0001 to 0005, respectively, have been input to the schedule queue 501 and have not been executed yet. In addition, the number of sheets to be printed of each print job is indicated by a number of sheets to be printed field 602. In addition, the state of each sheet type is indicated in the sheet type management table 301. Furthermore, the state of each paper feed deck is indicated in the paper feed deck state management table 401.

At this time, in S301, the control processing unit 207 accesses the memory unit 206 and sets 1 to a schedule management number variable (s_no). In addition, the control processing unit 207 accesses the schedule management table 601, refers to the number of jobs registered, and sets the value of the number of jobs registered to the number of print jobs (s_no_max) in the memory unit 206. In addition, the control processing unit 207 accesses the paper feed deck state management table 401, refers to the number of paper feed decks, and sets the value of the number of paper feed decks to the number of paper feed decks (deck_max).

In addition, the control processing unit 207 sets 1 to a paper feed deck management number variable (deck_no). In addition, the control processing unit 207 sets 0 to a variable (remain_num) for managing the number of sheets yet to be printed of each print job. After performing such initialization, the control processing unit 207 causes the process to proceed to S302.

In S302, the control processing unit 207 obtains the number of sheets remaining in each paper feed deck using the paper feed deck processing unit 204. The control processing unit 207 stores the obtained value in the number of sheets remaining (remain[deck_no]) in the memory unit 206 and causes the process to proceed to S303. In S303, the control processing unit 207 accesses the schedule management table 601 and refers to the job status of an s_no-th print job. If the job status is "complete", the control processing unit 207 causes the process to proceed to S321.

In S321, the control processing unit 207 accesses the memory unit 206, increments s_no by 1, and causes the process to proceed to S322. In S322, the control processing unit 207 accesses the memory unit 206 and determines whether or not s_no is smaller than or equal to s_no_max. If the control processing unit 207 determines that s_no is not smaller than or equal to s_no_max, the control processing unit 207 determines that the values of the paper feed schedule field 604 and the shortfall in the number of sheets field 605 of all the print jobs have been updated, and ends the process.

Referring back to S303, if the control processing unit 207 determines that the job status is not "complete", the control processing unit 207 causes the process to proceed to S304. In S304, the control processing unit 207 accesses the schedule management table 601 and reads the number of sheets yet to be printed of the s_no-th print job. The control processing unit 207 sets the read number of sheets yet to be printed to remain_num and causes the process to proceed to S305. In S305, the control processing unit 207 accesses the memory unit 206, sets 1 to deck_no, and causes the process to proceed to S306.

In S306, the control processing unit 207 accesses the paper feed deck state management table 401 used in the s_no-th print job and reads a sheet type registered to a deck_no-th paper feed deck. If the read sheet type is not a sheet type used in the s_no print job, the control processing unit 207 causes the process to proceed to S316. In S316, the control processing unit 207 accesses the memory unit 206, increment deck_no by 1, and causes the process to proceed to S317.

In S317, the control processing unit 207 accesses the memory unit 206 and determines whether or not deck_no is smaller than or equal to deck_max. Here, if the control processing unit 207 determines that deck_no is smaller than or equal to deck_max, the control processing unit 207 causes the process to proceed to S306 to check the state of a next paper feed deck.

On the other hand, if the control processing unit 207 determines in S306 that the sheet type registered to the deck_no-th paper feed deck is the sheet type used in the S_no-th print job, the control processing unit 207 causes the process to proceed to S307. In S307, the control processing unit 207 accesses the memory unit 206, reads the number of sheets remaining (remain[deck_no]) of the deck_no-th paper feed deck, and causes the process to proceed to S308.

In S308, the control processing unit 207 determines whether or not the value read in S307 is 0. If the control processing unit 207 determines that the value read in S307 is 0, the control processing unit 207 causes the process to proceed to S316.

On the other hand, if the control processing unit 207 determines in S308 that the value read in S307 is not 0, the control processing unit 207 causes the process to proceed to S309.

In S309, the control processing unit 207 accesses the schedule management table 601 and registers the paper feed deck number deck_no to the paper feed schedule field 604 of the s_no-th print job. Thereafter, the control processing unit 207 causes the process to proceed to S310. In S310, the control processing unit 207 accesses the memory unit 206 and determines whether or not remain_num is larger than remain [deck_no]. Here, if the control processing unit 207 determines that remain_num is not larger than remain[deck_no], the control processing unit 207 determines that the number of sheets used in the s_no-th print job can all be supplied from the number of sheets remaining remain[deck_no] of the deck_no-th paper feed deck.

The control processing unit 207 then causes the process to proceed to S311. In S311, the control processing unit 207 accesses the schedule management table 601 and stores the value of remain_num as the value of the number of sheets to be fed in the paper feed schedule field 604 of the s_no-th print job. Thereafter, the control processing unit 207 causes the process to proceed to S312.

In S312, the control processing unit 207 accesses the schedule management table 601 and the sheet type management table 301 and multiplies the printing time per sheet of the sheet type used by remain_num. The control processing unit 207 determines a product as required time, stores the value in the required time (s) in the paper feed schedule field 604 of the s_no-th print job, and causes the process to proceed to S321. The process will again be described from S310 hereinafter.

In S310, if, on the other hand, remain_num is larger than remain[deck_no], the control processing unit 207 determines that the number of sheets used in the s_no-th print job cannot all be supplied from the number of sheets remaining remain [deck_no] of the deck_no-th paper feed deck. The control processing unit 207 then causes the process to proceed to S313. In S313, the control processing unit 207 accesses the schedule management table 601 and stores the value of remain[deck_no] as the value of the number of sheets to be fed in the paper feed schedule field 604 of the s_no-th print job.

Thereafter, the control processing unit 207 causes the process to proceed to S314. In S314, the control processing unit 207 accesses the schedule management table 601 and the sheet type management table 301 and multiplies the printing time per sheet of the sheet type used by remain[deck_no]. The control processing unit 207 determines a product as the required time, stores the value in the required time (s) in the paper feed schedule field 604 of the s_no-th print job, and causes the process to proceed to S315.

In S315, the control processing unit 207 accesses the memory unit 206 and subtracts remain[deck_no] from remain_num. Thereafter, the control processing unit 207 causes the process to proceed to S316. In S316, the control processing unit 207 accesses the memory unit 206, increments deck_no by 1, and causes the process to proceed to S317.

In S306 to S317, the control processing unit 207 determines whether or not the sheet type used in the print job has been registered to the paper feed deck and whether or not the number of sheets of the sheet type registered to the paper feed deck is enough to perform printing in the print job. In S317, the control processing unit 207 accesses the memory unit 206 and determines whether or not deck_no is smaller than or equal to deck_max. If the control processing unit 207 determines that deck_no is not smaller than or equal to deck_max, the control processing unit 207 determines that the determination as to whether or not the number of sheets is enough to perform the print job has been made for all the paper feed decks and causes the process to proceed to S318.

In S318, the control processing unit 207 accesses remain_num of the memory unit 206 and determines whether or not remain_num is larger than 0. If the control processing unit 207 determines that remain_num is not larger than 0, the printing in the s_no-th print job can be completed with the sheets in the paper feed deck. In this case, the control processing unit 207 causes the process to proceed to S321. On the other hand, if the control processing unit 207 determines that remain_num is larger than 0, the printing in the s_no-th print job cannot be completed with the sheets in the paper feed deck.

In this case, the control processing unit 207 causes the process to proceed to S319. In S319, the control processing unit 207 accesses the schedule management table 601 and registers the value of remain_num as a shortfall value in the shortfall in the number of sheets field 605 of the s_no-th print job. Thereafter, the control processing unit 207 causes the process to proceed to S320.

In S320, the control processing unit 207 accesses the schedule management table 601 and the sheet type management table 301 and multiplies the printing time per sheet of the sheet type used by remain_num. The control processing unit 207 determines a product as the required time, registers the value to the required time (s) in the shortfall in the number of sheets field 605 of the s_no-th print job, and causes the process to proceed to S321. The method for creating the schedule management table 601 has been described. In order to hold a latest job status, this procedure is performed regularly as well as when a job has been input, when order of execution of jobs has been changed, and when a discharge event has been received from the printer engine 140.

Update of Schedule Screen

Next, a method for updating the schedule screen 1201 will be described with reference to a flowchart of FIG. 15.

Figure 15:
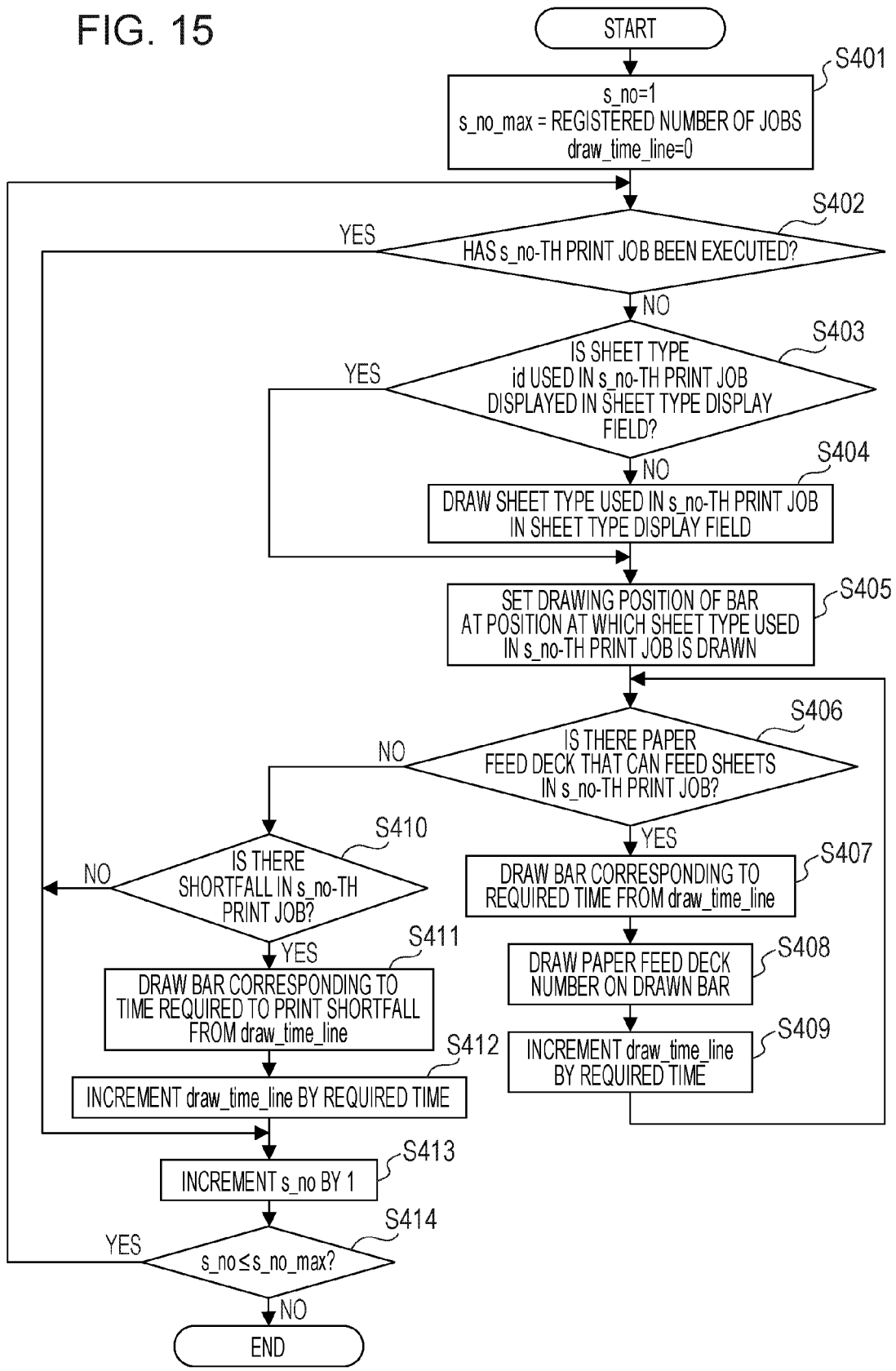
FIG. 15 is a flowchart illustrating a method for controlling the display apparatus.

FIG. 15 is a flowchart illustrating a method for controlling the display apparatus according to this embodiment. This example is an example of a process for updating the schedule screen 1201. Each step in this process is realized when executed by the CPU 114 of the controller box 200 in accordance with the corresponding program stored in the HDD 115. In the following description, the process will be described with reference to the modules illustrated in FIG. 2. It is to be noted that the update of the schedule is performed on the basis of the schedule management table 601.

In S401, the control processing unit 207 accesses the memory unit 206 and sets 1 to the schedule management number variable (s_no). In addition, the control processing unit 207 accesses the schedule management table 601, refers to the number of jobs registered, and sets the value of the number of jobs registered to the number of print jobs (s_no_max) in the memory unit 206. Furthermore, the control processing unit 207 sets 0 to a positional information variable (draw_time_line) for determining a position on the schedule screen 1201 at which the time of the beginning of execution and the required time of each print job are drawn.

Thereafter, the control processing unit 207 causes the process to proceed to S402. In S402, the control processing unit 207 accesses the schedule management table 601 and refers to the job status of the s_no-th print job. If the job status is "complete", the control processing unit 207 causes the process to proceed to S413. In S413, the control processing unit 207 accesses the memory unit 206, increment s_no by 1, and causes the process to proceed to S414.

In S414, the control processing unit 207 accesses the memory unit 206 and determines whether or not s_no is smaller than or equal to s_no_max. Here, if the control processing unit 207 determines that s_no is not smaller than or equal to s_no_max, the control processing unit 207 determines that a process for drawing the time of the beginning of execution and the required time on the schedule screen 1201 has been completed for all print jobs and ends the process. The process will again be described from S402 hereinafter.

On the other hand, if the control processing unit 207 determines in S402 that the job status of the s_no-th print job is not "complete", the control processing unit 207 causes the process to proceed to S403. In S403, the control processing unit 207 accesses the schedule management table 601 and the schedule screen 1201. The control processing unit 207 then determines whether or not a sheet type used in the s_no-th print job is displayed in a sheet type display field 1204 on the schedule screen 1201. Here, if the control processing unit 207 determines that the sheet type is displayed, the control processing unit 207 causes the process to proceed to S405.

On the other hand, if the control processing unit 207 determines in S403 that the sheet type is not displayed, the control processing unit 207 causes the process to proceed to S404. In S404, the control processing unit 207 draws the sheet type used in the s_no-th print job in the sheet type display field 1204. After the drawing, the control processing unit 207 causes the process to proceed to S405. In S405, the control processing unit 207 accesses the memory unit 206 and sets the drawing position of a schedule bar in accordance with a position at which the sheet type used in the s_no-th print job is drawn. For example, if the sheet type used in the s_no-th print job is drawn in (1) of the sheet type display field 1204, the control processing unit 207 sets the drawing position of the schedule bar in a region [1] of a schedule bar display field 1205 illustrated in FIG. 3A. After determining the drawing position of the schedule bar of the s_no-th print job, the control processing unit 207 causes the process to proceed to S406.

In S406, the control processing unit 207 accesses the schedule management table 601 and determines whether or not there is an available paper feed deck in the paper feed schedule field 604.

Here, if the control processing unit 207 determines that there is an available paper feed deck, the control processing unit 207 causes the process to proceed to S407. In S407, the control processing unit 207 refers to the time required for the paper feed deck having the paper feed deck number registered in the paper feed schedule field 604 to complete paper feed. The control processing unit 207 then displays a schedule bar corresponding to the required time in the schedule bar display field 1205 from draw_time_line.

For example, it can be seen in the paper feed schedule field 604 of a schedule number 0001 that it takes 200 seconds for Paper Feed Deck 3 to complete paper feed. Since draw_time_line is 0, the control processing unit 207 draws, as the required time, a schedule bar corresponding to 200 seconds in the region [1] of the schedule bar display field 1205 on the schedule screen 1201 from the drawing start position (draw_time_line). After the drawing, the control processing unit 207 causes the process to proceed to S408.

In S408, the control processing unit 207 reads the paper feed deck number from the paper feed schedule field 604 in the schedule management table 601 and superimposes the read paper feed deck number upon the schedule bar drawn in S407. Thereafter, the control processing unit 207 causes the process to proceed to S409. Although the paper feed deck number has been taken as an example here, a sign or a mark may be used instead of the number insofar as it serves as an identifier for identifying a paper feed deck.

In S409, the control processing unit 207 increments draw_time_line by the required time referred to in S407. Thereafter, the control processing unit 207 causes the process to proceed to S406. In S406 to S409, the processing is repeated the same number of times as the number of paper feed decks that can be used in the s_no-th print job. For example, in the case of the print job having the schedule number 0001, Paper Feed Deck 3 and Paper Feed Deck 5 are available. Therefore, two schedule bars 1209 are drawn.

If the control processing unit 207 determines in S406 that there is no available paper feed deck in the s_no-th print job, the control processing unit 207 causes the process to proceed to S410. In S410, the control processing unit 207 accesses the schedule management table 601 and reads the shortfall in the number of sheets field 605 of the s_no-th print job. On the other hand, if the control processing unit 207 determines that the shortfall in the number of sheets in the s_no-th print job is 0, the control processing unit 207 causes the process to proceed to S413. On the other hand, if the control processing unit 207 determines that the shortfall in the number of sheets in the s_no-th print job is not 0, the control processing unit 207 causes the process to proceed to S411. In S411, the control processing unit 207 accesses the shortfall in the number of sheets field 605 of the s_no-th print job.

The control processing unit 207 then refers to the time required to complete paper feed and displays a schedule bar corresponding to the required time in the schedule bar display field 1205 from draw_time_line. At this time, the schedule bar is drawn in a color different from one used for the schedule bar drawn in S408 in order to indicate that printing cannot be completed unless sheets are supplied to the paper feed deck. Any color or pattern may be used for the drawing insofar as the difference from a normal schedule bar can be visually recognized. After drawing the schedule bar, the control processing unit 207 causes the process to proceed to S412.

In S412, the control processing unit 207 increments draw_time_line by the required time referred to in S411. Thereafter, the control processing unit 207 causes the process to proceed to S413. Thus, the order of execution, the required time, the sheet type used, and the paper feed deck(s) used are displayed for all the print jobs. It is to be noted that when a schedule screen has been generated on the basis of the schedule management table 601, a screen 1208 illustrated in FIG. 3B is displayed.

Procedure for Displaying Popup

Next, a procedure for indicating, on the schedule screen 1201, that a paper feed deck has become empty will be described with reference to a flowchart of FIG. 16A.

Figure 16A:
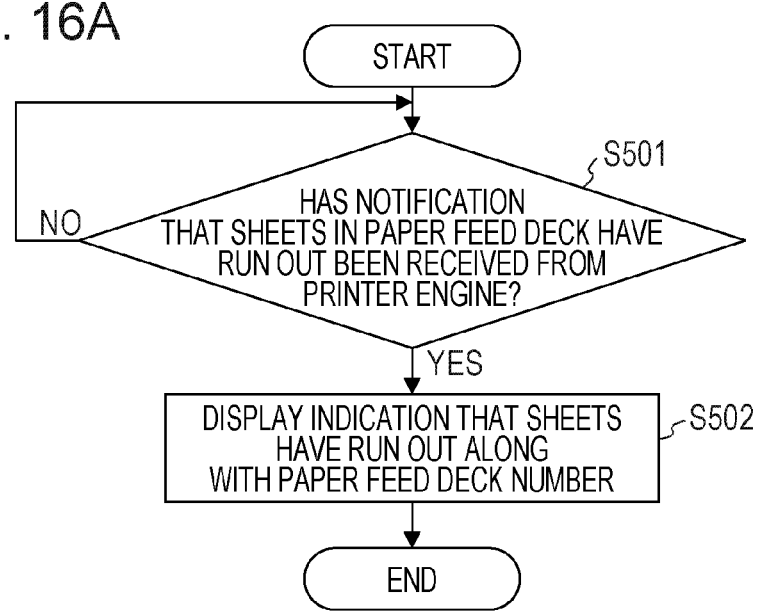
FIGS. 16A and 16B are flowcharts illustrating a method for controlling the display apparatus.

FIG. 16A is a flowchart illustrating a method for controlling the display apparatus according to this embodiment. This example is an example of the process for indicating, on the schedule screen 1201, that the number of sheets remaining in a paper feed deck has become smaller than a certain value, that is, for example, a paper feed deck has become empty. Each step in this process is realized when executed by the CPU 114 of the controller box 200 in accordance with the corresponding program stored in the HDD 115. In the following description, the process will be described with reference to the modules illustrated in FIG. 2. Assume that the initial state of the schedule management table 601 is as illustrated in FIG. 9 and the schedule screen 1208 is generated on the basis of the schedule management table 601. When the print job having the schedule number 0001 has begun, the printer engine 140 notifies the control processing unit 207 of the start of the print job.

Upon receiving the notification, the control processing unit 207 accesses the schedule management table 601 and changes the job status of the print job having the schedule number 0001 to "in progress". Thereafter, the printer engine 140 transmits a discharge event each time printing has been performed on a sheet in the print job having the schedule number 0001. Upon receiving each discharge event, the control processing unit 207 updates the number of sheets yet to be printed and the number of sheets to be fed in the paper feed schedule field 604. The schedule screen 1208 is updated on the basis of the updated schedule management table 601, and the width of the schedule bars 1209 decreases as the printing progresses. For example, when Paper Feed Deck 3 has fed all the sheets, the printer engine 140 notifies the control processing unit 207 that the sheets in the paper feed deck have all been used. As a result of this notification, the control processing unit 207 can identify the paper feed deck in which the number of sheets remaining has become smaller than the certain value. It is to be noted that, in this embodiment, the certain value is 0.

Upon receiving the notification in S501, the control processing unit 207 causes the process to proceed to S502. In S502, the control processing unit 207 causes the display processing unit 203 to display, on the schedule screen 1208, the paper feed deck number received in S501 and an indication that the paper feed deck having the paper feed number has become empty. For example, assume that the control processing unit 207 has received a signal indicating that there is no sheets in Paper Feed Deck 3, which is used in the print job having the schedule number 0001. In this case, the control processing unit 207 performs display control in such a way as to display a message 1211 saying "Paper Feed Deck 3 is empty" indicated in a schedule screen 1210 illustrated in FIG. 3C. After displaying the message 1211, the control processing unit 207 ends the process. Although the indication that the paper feed deck has become empty is displayed at the position of the message 1211 in this description, the indication may be displayed anywhere in the schedule screen 1210.

Procedure for Removing Popup

Figure 16B:
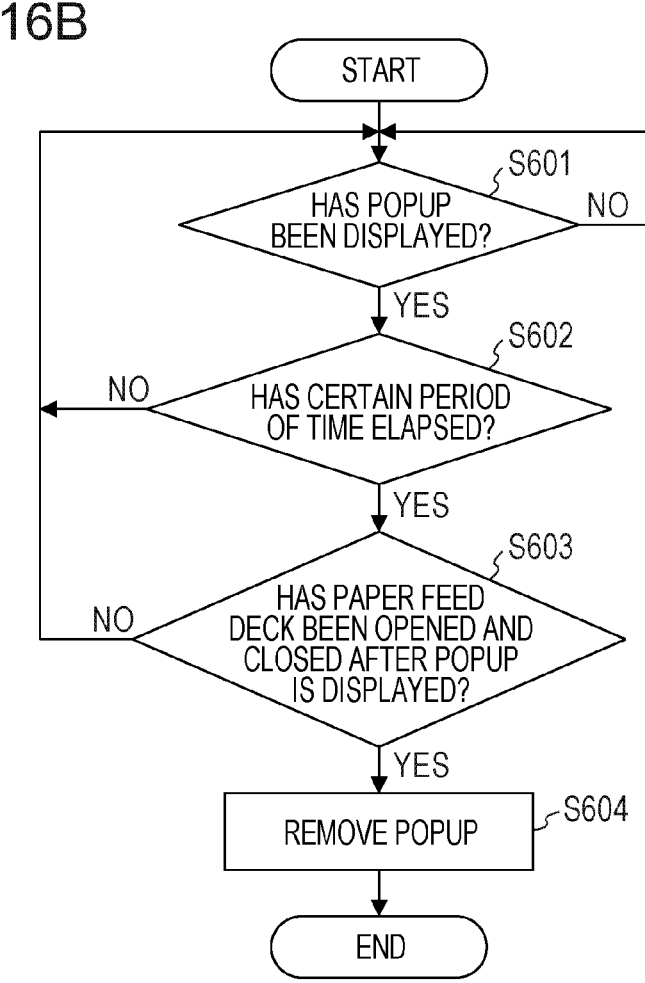

FIG. 16B is a flowchart illustrating a method for controlling the display apparatus according to this embodiment. This example is an example of a process for removing, from the schedule screen 1210, the message, which is displayed as a result of the process illustrated in FIG. 16A, indicating that the paper feed deck has become empty. Each step in this process is realized when executed by the CPU 114 of the controller box 200 in accordance with the corresponding program stored in the HDD 115. In the following description, the process will be described with reference to the modules illustrated in FIG. 2. Assume that, in the initial state, Paper feed Deck 3 has become empty while the printer engine 140 is performing printing in the print job having the schedule number 0001, and, as a result, the message 1211 illustrated in FIG. 3C has been displayed on the schedule screen 1210.

In addition, a certain period of display time, for which the popup remains displayed, is stored in the memory unit 206 in advance.

In S601, the control processing unit 207 determines whether or not a message indicating that a paper feed deck has become empty is displayed on the schedule screen 1210. If the control processing unit 207 determines that a message indicating that a paper feed deck has become empty is displayed on the schedule screen 1210, the control processing unit 207 causes the process to proceed to S602.

In S602, the control processing unit 207 accesses the memory unit 206 and determines whether or not a predetermined time has elapsed. If the control processing unit 207 determines that the predetermined time has not elapsed, the control processing unit 207 causes the process to proceed to S601. On the other hand, if the control processing unit 207 determines that the predetermined time has elapsed, the control processing unit 207 causes the process to proceed to S603.

In S603, the control processing unit 207 instructs the paper feed deck processing unit 204 to check whether or not the empty paper feed deck has been opened and closed. If the control processing unit 207 determines that the identified empty paper feed deck has not been opened and closed, the control processing unit 207 causes the process to proceed to S601. If the control processing unit 207 determines in S603 that the empty paper feed deck has been opened and closed, the control processing unit 207 causes the process to proceed to S604. In S604, the control processing unit 207 instructs the display processing unit 203 to remove the message indicating that the paper feed deck has become empty. Thereafter, the control processing unit 207 ends the process. Thus, by keep displaying an indication that a paper feed deck has become empty until the empty paper feed deck has been opened and closed, it becomes possible to avoid a situation in which the operator misses the indication and accordingly cannot identify the empty paper feed deck. It is to be noted that, in S603, the control processing unit 207 can detect that sheets have been supplied from the printer engine 140 to the paper feed deck, of which the control processing unit 207 has been notified, and the number of sheets remaining has changed from a value smaller than the certain value to a value with which paper feed is possible.

Workflow for Setting Sheets in Empty Paper Feed Deck and Inputting Print Job

One of printing workflows is a workflow in which sheets are set in a paper feed deck, a sheet type is registered to the paper feed deck in which the sheets have been set, and a print job that uses the sheet type is input. When the operator sets sheets in an empty paper feed deck and then inputs a print job that uses the set sheets, it is troublesome to perform an operation for registering a sheet type to the paper feed deck every time. Here, a method for reducing this burden will be described. First, as a preliminary operation, the operator operates the operation panel 120 to display a workflow shortcut screen 1601 illustrated in FIG. 17 on the operation panel 120.

Figure 17:
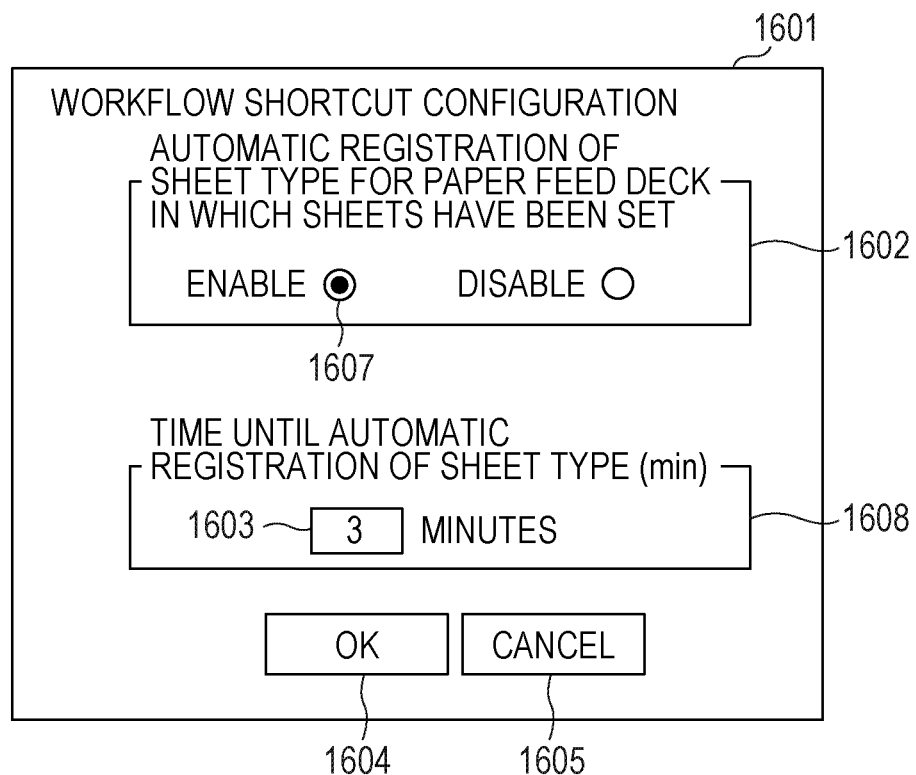
FIG. 17 is a diagram illustrating an example of a UI screen displayed on the operation panel.

In FIG. 17, an item 1602 determines whether or not to automatically register a sheet type to a paper feed deck in which sheets have been set. In addition, an item 1608 determines time until the automatic registration of a sheet type is performed. If the operator selects a button 1607 for automatically registering a sheet type, inputs time in a field 1603, and presses an OK button 1604, the control processing unit 207 writes, to the memory unit 206, information indicating the automatic registration of a sheet type and the time until the automatic registration is performed.

Next, a process for setting sheets in an empty paper feed deck and inputting a print job will be described with reference to FIG. 18.

Figure 18:
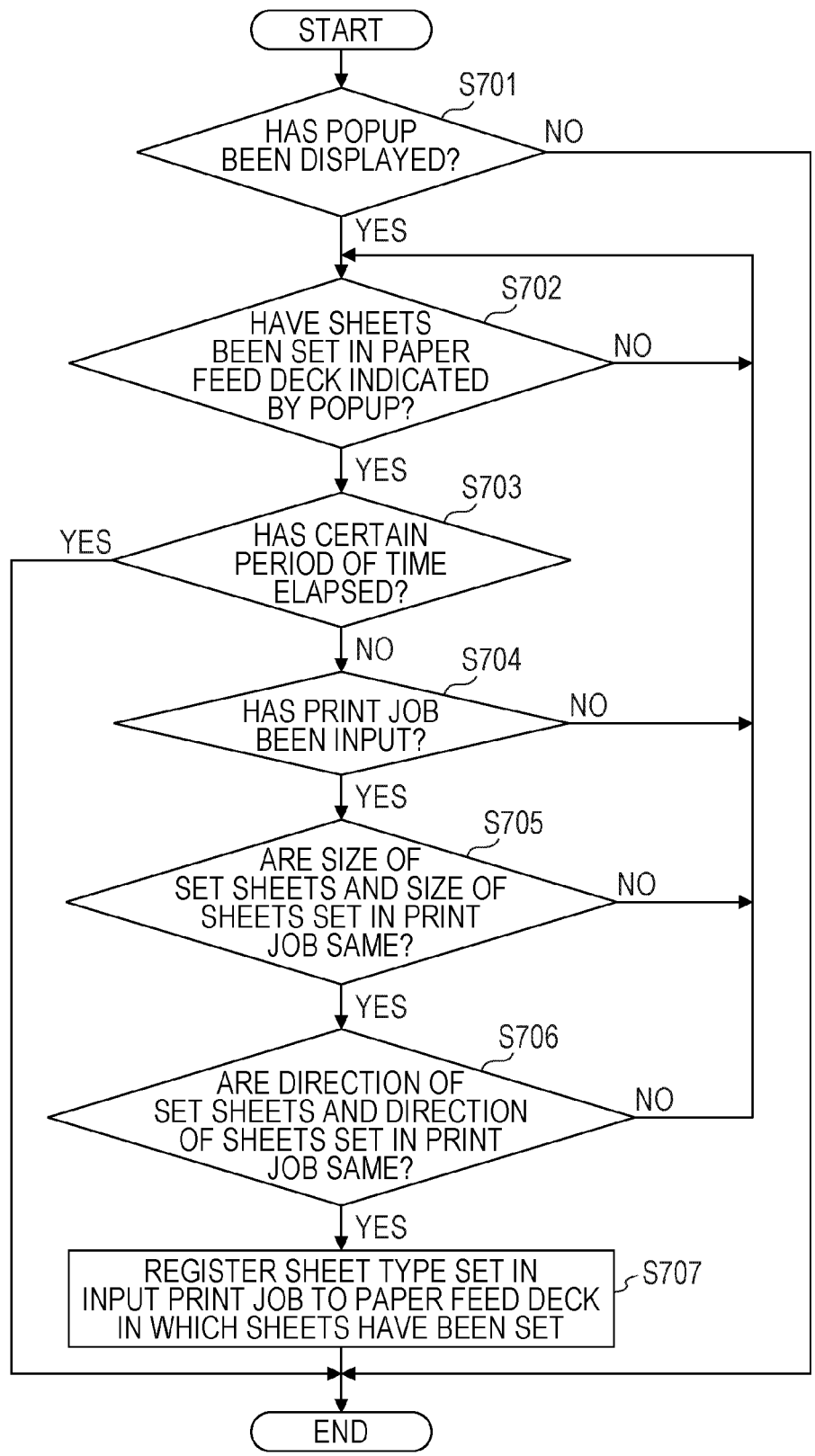
FIG. 18 is a flowchart illustrating a method for controlling the printing apparatus.

FIG. 18 is a flowchart illustrating a method for controlling the printing apparatus according to this embodiment. This example is an example of the process for setting sheets in an empty paper feed deck and inputting a print job. Each step in this process is realized when executed by the CPU 114 of the controller box 200 in accordance with the corresponding program stored in the HDD 115. In the following description, the process will be described with reference to the modules illustrated in FIG. 2.

In S701, the control processing unit 207 determines, using the display processing unit 203, whether or not a popup indicating that a paper feed deck has become empty is displayed. If the control processing unit 207 determines that a popup indicating that a paper feed deck has become empty is not displayed, the control processing unit 207 ends the process.

On the other hand, if the control processing unit 207 determines in S701 that a popup indicating that there is an empty paper feed deck is displayed, the control processing unit 207 causes the process to proceed to S702. In S702, the control processing unit 207 determines, using the paper feed deck processing unit 204, whether or not sheets have been set in the empty paper feed deck. Here, if the control processing unit 207 determines that sheets have been set in the empty paper feed deck, the control processing unit 207 causes the process to proceed to S703.

In S703, the control processing unit 207 accesses the memory unit 206 and reads the value set in the field 1603. The control processing unit 207 then determines whether or not a certain period of time indicated by the read value has elapsed since the sheets were set in the empty paper feed deck. Here, if the control processing unit 207 determines that the certain period of time has elapsed, the control processing unit 207 ends the process.

On the other hand, if the control processing unit 207 determines that the certain period of time has not elapsed, the control processing unit 207 causes the process to proceed to S704. In S704, the control processing unit 207 accesses the print job analysis unit 201 and determines whether or not a print job has been input. Here, if the control processing unit 207 determines that a print job has not been input, the control processing unit 207 causes the process to proceed to S702.

On the other hand, if the control processing unit 207 determines that a print job has been input, the control processing unit 207 causes the process to proceed to S705. In S705, the control processing unit 207 accesses the paper feed deck processing unit 204 and determines whether or not the size of the sheets set in the empty paper feed deck and the size of sheets set in the print job determined in S704 to have been input are the same.

Here, if the control processing unit 207 determines that the sizes are not the same, the control processing unit 207 causes the process to proceed to S702. On the other hand, if the control processing unit 207 determines in S705 that the sizes are the same, the control processing unit 207 causes the process to proceed to S706.

In S706, the control processing unit 207 accesses the paper feed deck processing unit 204 and determines whether or not the direction of the sheets set in the empty paper feed deck and the direction of the sheets set in the input print job are the same. Here, if the control processing unit 207 determines that the sheet directions are not the same, the control processing unit 207 causes the process to proceed to S702.

On the other hand, if the control processing unit 207 determines that the sheet directions are the same, the control processing unit 207 causes the process to proceed to S707. In S707, the control processing unit 207 instructs the sheet type editing unit 205 to register a sheet type set in the input print job to the paper feed deck in which the sheets have been set. Thereafter, the control processing unit 207 ends the process. Thus, by automatically registering a sheet type to a paper feed deck in which sheets have been set, the burden on the operator to register a sheet type can be reduced.

Process for Setting Sheets in Empty Paper Feed Deck

One of the printing workflows is a workflow in which a print job that uses a sheet type that has not been set in the paper feed decks is input and sheets are set in an empty paper feed deck. An example of this process will be described hereinafter with reference to FIG. 19.

Figure 19:
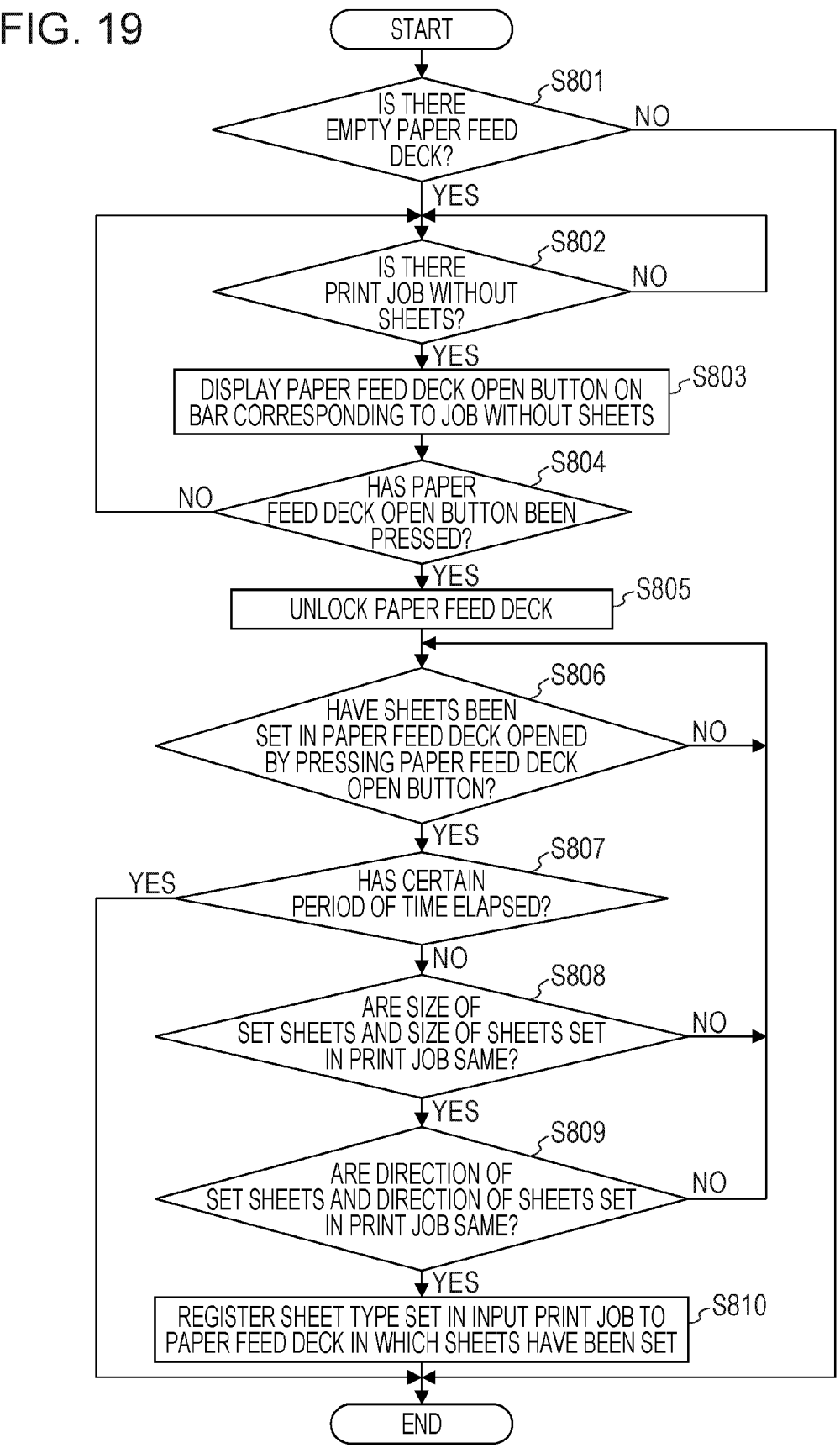
FIG. 19 is a flowchart illustrating a method for controlling the printing apparatus.

FIG. 19 is a flowchart illustrating a method for controlling the printing apparatus according to this embodiment. This example is an example of a process for inputting a print job that uses a sheet type that has not been set in the paper feed decks and setting sheets in an empty paper feed deck. Each step in this process is realized when executed by the CPU 114 of the controller box 200 in accordance with the corresponding program stored in the HDD 115. In the following description, the process will be described with reference to the modules illustrated in FIG. 2.

In S801, the control processing unit 207 determines, using the display processing unit 203, whether or not a popup indicating that there is an empty paper feed deck is displayed. If the control processing unit 207 determines that a popup indicating that there is an empty paper feed deck is not displayed, the control processing unit 207 ends the process.

On the other hand, if the control processing unit 207 determines in S801 that a popup indicating that there is an empty paper feed deck is displayed, the control processing unit 207 causes the process to proceed to S802.

In S802, the control processing unit 207 accesses the schedule management table 601 and determines whether or not there is a print job in which sheets have run out (out of paper). Here, if the control processing unit 207 determines that there is a print job in which sheets have run out, the control processing unit 207 causes the process to proceed to S803. In S803, the control processing unit 207 instructs the display processing unit 203 to display a button for opening the empty paper feed deck beside a schedule bar of the print job found in S802 in which sheets have run out.

An example of display will be described with reference to a schedule screen 1212 illustrated in FIG. 3D. In FIG. 3D, the print job in which sheets have run out is Job 6, and the schedule bar of Job 6 is a schedule bar 1214. The button for opening the empty paper feed deck is a button 1215. After the display, the control processing unit 207 causes the process to proceed to S804. In S804, the control processing unit 207 determines, using the paper feed deck processing unit 204, whether or not the paper feed deck open button 1215 has been pressed. Here, if the control processing unit 207 determines that the paper feed deck open button 1215 has not been pressed, the control processing unit 207 causes the process to proceed to S802. On the other hand, if the control processing unit 207 determines that the paper feed deck open button 1215 has been pressed, the control processing unit 207 causes the process to proceed to S805.

In S805, the control processing unit 207 instructs the paper feed deck processing unit 204 to unlock the paper feed deck for which the paper feed deck open button 1215 has been pressed. Thereafter, the control processing unit 207 causes the process to proceed to S806. In S806, the control processing unit 207 determines, using the paper feed deck processing unit 204, whether or not sheets have been set in the paper feed deck opened by pressing the paper feed deck open button 1215. If the control processing unit 207 determines that sheets have been set in the paper feed deck, the control processing unit 207 causes the process to proceed to S807. In S807, the control processing unit 207 accesses the memory unit 206 and reads the value set in the field 1603 illustrated in FIG. 17.

The control processing unit 207 then determines whether or not the certain period of time indicated by the read value has elapsed since the paper feed deck open button 1215 was pressed. Here, if the control processing unit 207 determines that the certain period of time indicated by the read value has elapsed, the control processing unit 207 ends the process.

On the other hand, if the control processing unit 207 determines in S807 that the certain period of time indicated by the read value has not elapsed, the control processing unit 207 causes the process to proceed to S808.

In S808, the control processing unit 207 accesses the paper feed deck processing unit 204 and determines whether or not the size of the sheets set in the paper feed deck and the size of sheets set in the print job referred to in S802 in which sheets have run out are the same. Here, if the control processing unit 207 determines that the sizes are not the same, the control processing unit 207 causes the process to proceed to S806. On the other hand, if the control processing unit 207 determines in S808 that the sizes are the same, the control processing unit 207 causes the process to proceed to S809.

In S809, the control processing unit 207 accesses the paper feed deck processing unit 204 and determines whether or not the direction of the sheets set in the paper feed deck and the direction of sheets set in the print job referred to in S802 in which sheets have run out are the same. Here, if the control processing unit 207 determines that the sheet directions are not the same, the control processing unit 207 causes the process to proceed to S806.

On the other hand, if the control processing unit 207 determines in S809 that the sheet directions are the same, the control processing unit 207 causes the process to proceed to S810. In S810, the control processing unit 207 instructs the sheet type editing unit 205 to register a sheet type of the print job referred to in S802 as a sheet type of the paper feed deck in which the sheets have been set. Thereafter, the control processing unit 207 ends the process.

Thus, by displaying the button for opening an empty paper feed deck in the schedule screen, the paper feed deck can be opened from the schedule screen. Furthermore, by automatically registering a sheet type to a paper feed deck in which sheets have been set, the burden on the operator to register a sheet type can be reduced.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-130537, filed Jun. 21, 2013, which is hereby incorporated by reference herein in its entirety.

What is claimed is:

1. A display apparatus comprising:
   a displaying unit configured to display, for each type of sheet, a display object on a schedule screen, wherein on the schedule screen each type of sheet is displayed on a first axis and a time required to execute a job is displayed on a second axis, and the display object includes information for identifying a sheet storage unit to be used in the job; and
   a display control unit configured to control the displaying unit to display, on the display object, the information for identifying the sheet storage unit to be used in the job,
   wherein, with respect to first and second sheet storage units to be used in a job, the display control unit controls the displaying unit to display information for identifying the first sheet storage unit and information for identifying the second sheet storage unit on the display object so that it can be recognized that a sheet storage unit used in the job is to be changed from the first sheet storage unit to the second sheet storage unit in response to running out of sheets stored in the first sheet storage unit.

2. The display apparatus according to claim 1,
   wherein the display control unit controls the displaying unit to display on the schedule screen a message indicating that the sheets stored in the first sheet storage unit have run out, in response to running out of the sheets stored in the first sheet storage unit.

3. The display apparatus according to claim 1, wherein the type of sheet is displayed along a vertical axis in the schedule screen and time is displayed along a horizontal axis in the schedule screen.

4. The display apparatus according to claim 3, wherein the display control unit controls the displaying unit to display on the schedule screen the message indicating that the sheets stored in the first sheet storage unit have run out, until the first sheet storage unit is opened and closed.

5. The display apparatus according to claim 1, wherein the information for identifying the first sheet storage unit is an identifier assigned to the first sheet storage unit, and the information for identifying the second sheet storage unit is an identifier assigned to the second sheet storage unit.

6. The display apparatus according to claim 5, wherein the identifier is a number, a sign, or a mark.

7. The display apparatus according to claim 1, wherein the displaying unit displays, for each type of sheet, a display object on the schedule screen, the display object having a length corresponding to a time required to execute a job.

8. A control method in a display apparatus having a displaying unit configured to display, for each type of sheet, a display object on a schedule screen, wherein on the schedule screen each type of sheet is displayed on a first axis and a time required to execute a job is displayed on a second axis, and the display object includes information for identifying a sheet storage unit to be used in the job, the control method comprising:
   performing control to display, on the display object, the information for identifying the sheet storage unit to be used in the job; and
   performing control, with respect to first and second sheet storage units to be used in a job, to display information for identifying the first sheet storage unit and information for identifying the second sheet storage unit on the display object so that it can be recognized that a sheet storage unit used in the job is to be changed from the first sheet storage unit to the second sheet storage unit in response to running out of sheets stored in the first sheet storage unit,
   wherein the displaying step displays information for identifying the sheet storage unit specified in the step of specifying on the object.

9. A non-transitory computer-readable storage medium for storing a computer program for controlling a display apparatus having a displaying unit configured to display, for each type of sheet, a display object on a schedule screen, wherein on the schedule screen each type of sheet is displayed on a first axis and a time required to execute a job is displayed on a second axis, and the display object includes information for identifying a sheet storage unit to be used in the job, the computer program comprising:

performing control to display, on the display object, the information for identifying the sheet storage unit to be used in the job; and performing control, with respect to first and second sheet storage units to be used in a job, to display information for identifying the first sheet storage unit and information for identifying the second sheet storage unit on the display object so that it can be recognized that a sheet storage unit used in the job is to be changed from the first sheet storage unit to the second sheet storage unit in response to running out of sheets stored in the first sheet storage unit.

* * * * *